Oct. 13, 1931.  J. C. MORRELL  1,827,714
DEHYDRATION OF EMULSIFIED OIL
Filed Dec. 5, 1929
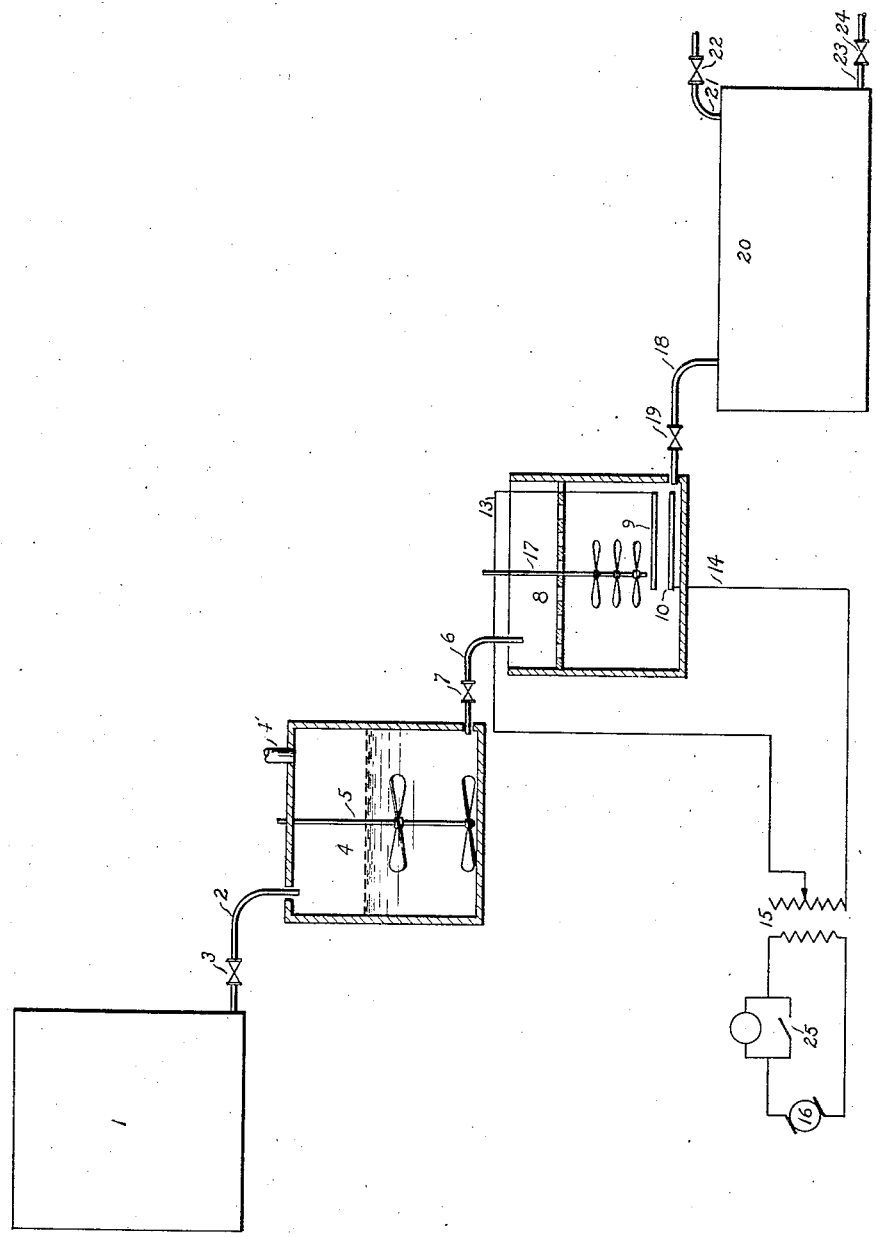
INVENTOR
Jacque C. Morrell
BY Frank L. Belknap
ATTORNEY Patented Oct. 13, 1931

1,827,714

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

DEHYDRATION OF EMULSIFIED OIL

Application filed December 5, 1929. Serial No. 411,798.

This invention relates to improvements in the art of dehydrating emulsified oils with special application to the breaking of crude oil emulsions. Usually these emulsions consist of water and oil or mixed phases of water in oil and oil in water.

In one successful process for the dehydration of oils containing water in a dispersed state, the oil to be treated is subjected to a high potential current which apparently disrupts the film surrounding the dispersed droplet and/or affects the surface tension relationship so that the dispersed water droplets coalesce, forming a separate water layer which is readily separated from the oil.

Owing to the high di-electric constants of the oil and water, passage of the electric current is difficult, reducing the capacity of the process and making necessary the use of very high potential differences for effective work.

In the present invention I make use of finely divided water-insoluble conducting materials such as metals which are dispersed or suspended throughout the oil to be treated and are kept in a state of temporary dispersion, preferably by agitating the oil during passage of the electric current therethrough. Metal, being a good conductor of electricity and being dispersed throughout the oil, substantially reduces the layer of oil through which the current must pass, the thickness of the layer depending upon the amount and size of the dispersed material. The passage of the electric current is thus facilitated and the potential difference necessary for breaking the emulsion is reduced because of the reduced thickness of the oil layer which increases the capacity and cuts down the cost of treatment.

Practically all metals and/or mixtures or alloys thereof may be used, for example, magnesium, aluminum, zinc, iron, tin, lead, nickel, copper, chromium and others.

The single figure in the drawing is a diagrammatic side elevational view, partly in vertical section, of apparatus in which the invention may be carried out.

Referring more in detail to the drawing, the oil emulsion to be treated may be fed from storage tank 1 through line 2, controlled by valve 3, into vessel 4. The metal in a finely divided state, for example, 50 to 300 mesh, more or less, may be introduced through charging conduit 4' into the vessel 4 containing the oil to be treated and the contents are preferably kept in a state of agitation to effect distribution. Element 5, consisting of a shaft and paddles, is suitable for this purpose. The oil emulsion containing the finely suspended metal is fed through line 6, controlled by valve 7, into the treater 8. The mixture may be there caused to be passed between surfaces at the terminals of the two electrodes 9 and 10, between which is maintained a high potential alternating current. Connection may be made between the electrodes 9 and 10, respectively, by wires 13 and 14 to the transformer 15 which is supplied with power from any source of electrical current, for example, from an electrical generator 16. For convenience a make and break switch 25 may be interposed in the circuit between the generator and the transformer.

The potential difference between the electrodes may be varied according to the nature of the oil treated, the percentage of metal introduced, and the amount of water present. Variations between 550 to 33,000 volts may be used for complete separation.

The treater 8 may be equipped with an agitating device 17 which may consist of a shaft and paddles or any other suitable mixing device. The passage of the oil emulsion between the electrode surfaces causes the current to be passed through the emulsion from metal particle to particle and ultimately from electrode to electrode, during which passage the emulsion is broken, causing separation of the oil and water. The separated layers or masses of oil and water may pass through line 18, controlled by valve 19, into the settling tank 20. The oil may be removed from the settling tank through line 21, controlled by valve 22, and the water through line 23 controlled by valve 24. The suspended metal both in the oil and water layer may be recovered for reuse by further settling or other methods of separation.

The percentage of metal to be used depends upon the nature of the oil, the percent of water present therein, the type of emulsion, the fineness of the metal, and the kind of metal.

As examples, from one to ten percent of iron of 150 mesh, based upon the weight of the oil emulsion treated, may be used. A similar amount may be used with satisfactory results for metals such as copper and zinc. Larger percentages of metals cause quicker separation, but may make the process more costly because of the necessity for recovery of the metal. A crude oil emulsion containing, for example, approximately 20% of water, and having suspended therein approximately 10% by weight of iron of approximately 150 mesh, when subjected to the treatment described, using a potential difference of approximately 10,000 volts, will give a good commercial separation of oil and water.

The above examples are given for illustrative purposes only and are not to be construed as limitations upon the broad scope and spirit of the invention.

I claim as my invention:

1. Steps in the dehydration of emulsified oil, which consists in suspending water-insoluble conducting material in finely divided condition in the emulsion, then passing an electric current through said emulsion to effect separation and permitting the water to separate from the oil in a settling stage.

2. Steps in the process of separating an oil and water emulsion, which comprise suspending in the emulsion water-insoluble conducting material in finely divided condition in sufficient quantity to improve the conductivity of said emulsion, then passing an electric current through said emulsion to effect separation and permitting the separated oil and water to separate in a settling stage.

3. Steps in the separation of oil from an oil and water emulsion, which comprise suspending in the emulsion water-insoluble conducting material in finely divided condition in sufficient quantity to improve the conductivity of said emulsion, then subjecting the emulsion to an electric current to effect separation between the oil and water.

4. Steps in the separation of oil from an oil and water emulsion, which comprise suspending in the emulsion metal in finely divided condition in sufficient quantity to improve the conductivity of said emulsion, and then subjecting said emulsion to an electrical current to separate the oil and water.

In testimony whereof I affix my signature.

JACQUE C. MORRELL.